Nov. 3, 1942.                    J. C. KIRCHER, JR                    2,300,934
                                  GRASS CATCHER
                              Filed April 10, 1942              2 Sheets-Sheet 1
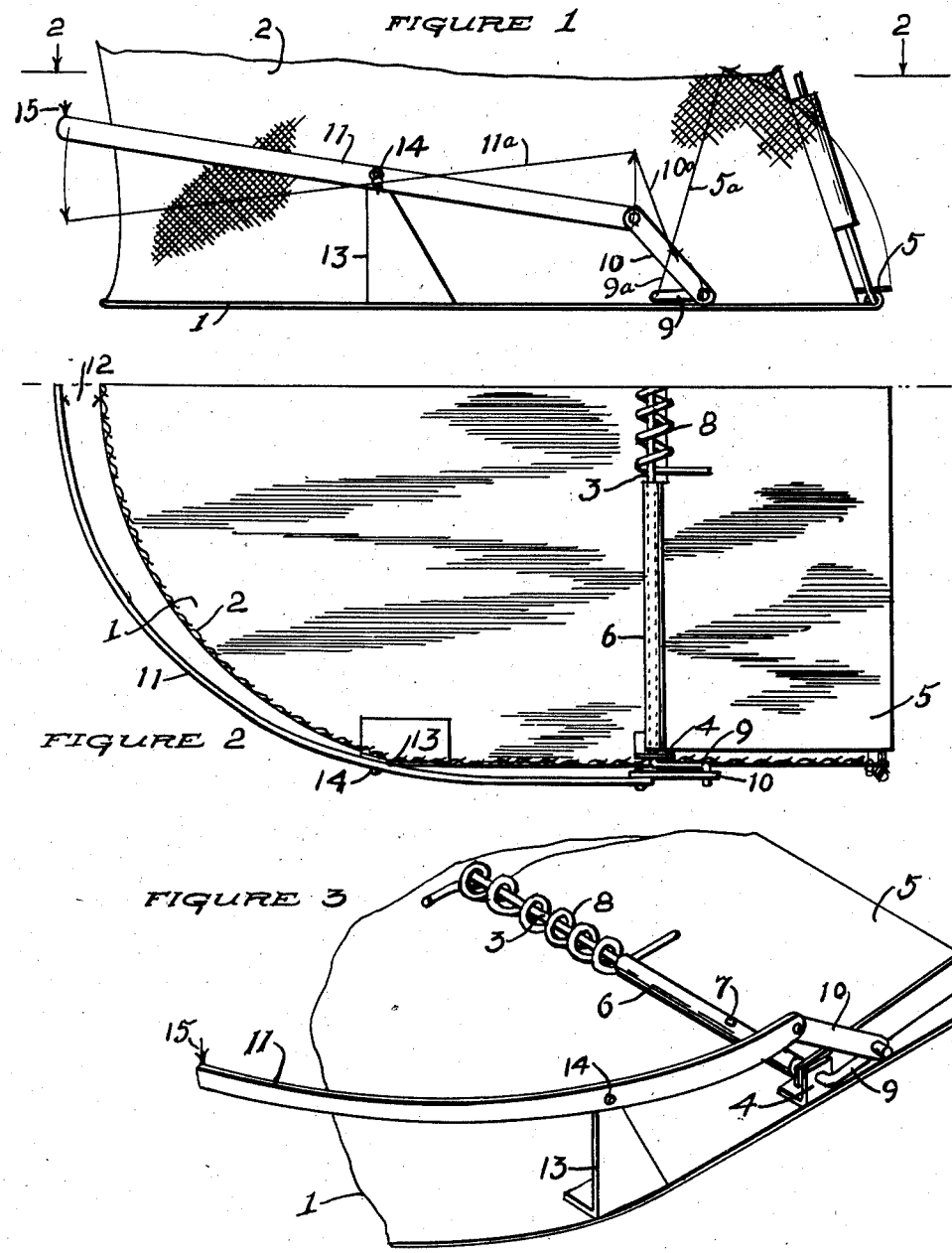
INVENTOR
John Charles Kircher Jr
John A. Naismith
ATTORNEY Nov. 3, 1942.　　　J. C. KIRCHER, JR　　　2,300,934
GRASS CATCHER
Filed April 10, 1942　　　2 Sheets-Sheet 2
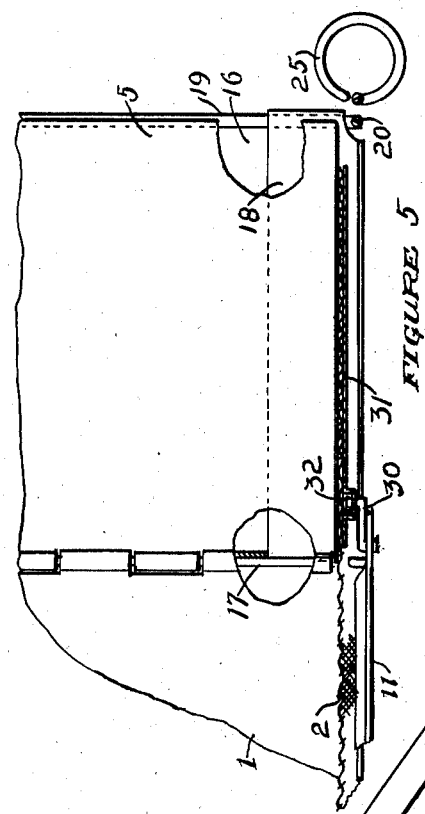
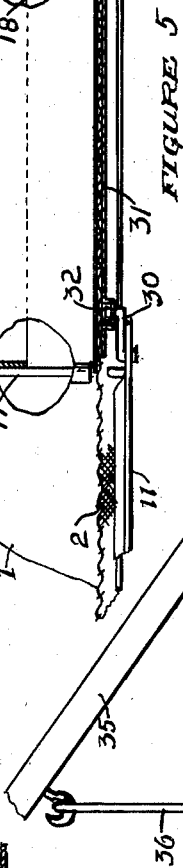
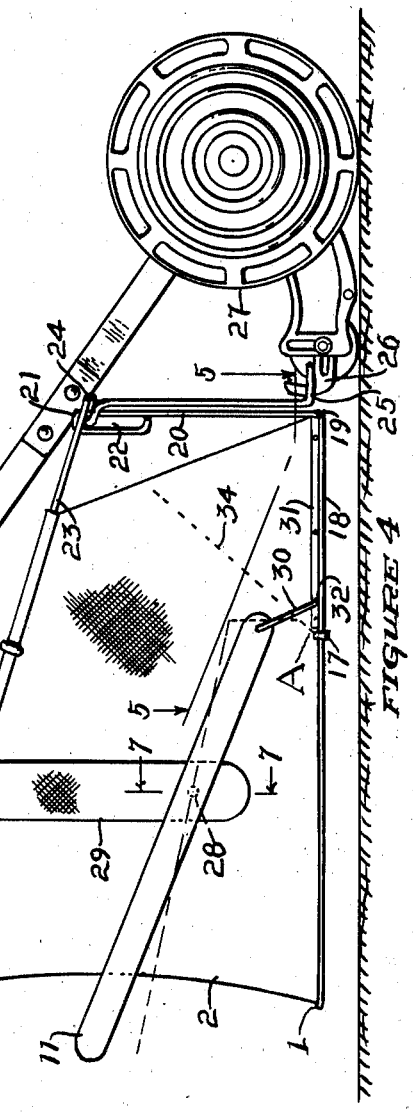
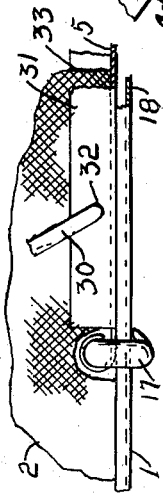
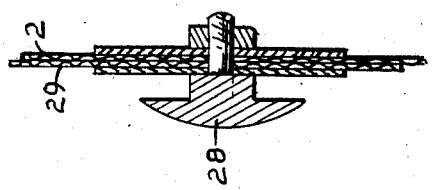
INVENTOR
John Charles Kircher Jr
BY
John A. Naismith Patented Nov. 3, 1942

2,300,934

UNITED STATES PATENT OFFICE 2,300,934

GRASS CATCHER

John Charles Kircher, Jr., Mountain View, Calif.

Application April 10, 1942, Serial No. 438,820

6 Claims. (Cl. 56—202)

This application is a continuation in part of my application filed July 5, 1941, bearing Serial No. 401,157.

My invention relates to that form of grass catcher that is attached to a lawn mower and suspended, in part, from the handle thereof, in a position to catch the cut grass thrown rearwardly by the mower during the cutting process.

It is one object of the present invention to provide means whereby the operator of the lawn mower may quickly and easily transfer the grass accumulating on the forward portion of the catcher to the rear thereof without stopping the mowing operation and without having to apply his hands to that work.

It is also an object to provide a structure of the character indicated constructed and arranged in such a manner that cut grass cannot interfere with the free and proper working of its movable parts, and one that can be easily and quickly manipulated in such a manner as to properly distribute and settle the grass therein.

Finally, it is an object to provide a device of the character indicated that will be economical to manufacture, simple in form and construction, strong and durable, and highly efficient in its practical application.

In the drawings:

Figure 1 is a side elevation of a portion of a grass catcher equipped with a device embodying my invention.

Figure 2 is a plan view of one-half of the device, taken on line 2—2 of Figure 1.

Figure 3 is a perspective view of a portion of the structure, partly broken away.

Figure 4 is a side elevation of another embodiment of my invention in position on a lawn mower.

Figure 5 is a sectional view on line 5—5, Figure 4.

Figure 6 is a greatly enlarged side elevation of the structure at the point "A" on Figure 4.

Figure 7 is an enlarged section on line 7—7, Figure 4.

Referring now more particularly to the drawings, at 1 is shown the bottom plate of a grass catcher, and at 2 the upstanding fabric wall.

In effecting my invention I mount a shaft 3 in bearings 4 disposed on opposite sides of plate 1 and spaced a little way back from its forward edge as shown.

At 5 I show a throw-plate disposed to overlie the forward portion of plate 1 and extend slightly past its forward edge. Portions of the rear edge of this plate are turned around the shaft 3 as at 6 and fixedly secured thereto as at 7. A spring 8 is mounted on the shaft 3 to bear against plates 1 and 5 and normally maintain the latter plate with its forward edge in contact with plate 1.

Shaft 3 has a crank 9 formed on each end thereof and on the outside of wall 2, these cranks being disposed to lie in substantially the plane of the plate 5.

Pivotally mounted on each crank 9 is a link 10, and pivotally connected to both links 10 is an operating bar 11.

Each end of operating bar 11 is connected to a link 10, its central portion passing around the rear of the wall 2 and spaced a little therefrom as shown at 12. The bar 11 is pivotally mounted on brackets 13 as at 14 disposed on opposite sides of plate 1, and these pivotal points are so positioned that the bar 11 functions as a lever of the first class with its short arm extending from the pivotal point, or fulcrum 14, to the link 10, and its long arm extending from the fulcrum 14 to the point 12.

The relative proportionate lengths of the short arm of bar 11, the attached link 10, and the crank 9, are such that when in a normal position each part lies as shown in solid lines in the several views, but when the lever bar 11 is pressed downwardly at 15 these several parts assume the positions indicated by center lines at 11a, 10a, and 9a in Figure 1. Since the plate 5 is a unitary part of the crank shaft 3 the operation described causes the plate 5 to swing upwardly and backwardly to the position 5a. Upon release of the pressure at 15 the spring 8 will operate to restore the several parts to their normal positions.

It will be noted that by means of the structure described not only is the direction of movement of plate 5 controlled as desired, that is it may be swung upwardly and backwardly or dropped back to its original position as desired, but it is operated so suddenly and quickly that any grass or other material deposited thereon by the mower is projected upwardly and backwardly against rear wall 2.

The above described quick action of throw-plate 5 is an important feature of the invention, and in the structure described this action is accomplished by properly proportioning the several elements. When the operator finds that too much grass is accumulating along the front portion of the catcher he operates the bar 11 by pressing down on the same at 15 by applying one foot thereto. But the arc traversed by the outer portion of plate 5 is many times greater than the arc traversed by the arm 11 at 15 due to the arrangement of parts described, with the result that the material gathered on said plate 5 is suddenly and forcibly projected rearwardly and against the rear wall 2.

Figures 4, 5, 6 and 7 show another embodiment of my invention wherein the bottom plate 1 has a portion of its forward portion removed to form an opening 16, the forward portion forming the throw-plate 5 which is hinged to the main bottom portion 1, the parts 1 and 5 here being turned around a fixed rod 17 to form said hinge. In this embodiment the side portions of plate 1 extend forwardly under the throw-plate as at 18 and are attached to a transversely extending rod 19 forming the front end of the catcher, the ends of this rod being turned upwardly to form upstanding parts 20, the top ends of the parts 20 being turned back upon themselves as at 21 to form guide loops 22.

The fabric wall 2 is mounted on the bottom 1 and the top rod 23 in the usual manner, but each forward end of the rod 23 is turned into a loop as at 24 encompassing the parts 20 and slidably engaging the loops 22 and thence passing downwardly in substantially parallel relation to parts 20 and formed into horizontal loops as 25 to engage the hooks as 26 on the mower 27.

In this embodiment the operating bar 11 is pivotally mounted on the sides of the catcher as at 28, this mounting being reinforced by a canvas strap 29 supported by rod 23.

The forward ends of the operating bar 11 are pivotally connected to links as 30, the other ends of the links 30 being pivotally connected to the upturned sides as 31 of the throw-plate 5 a little forwardly of its pivotal mounting as at 32, and the fabric wall of the catcher also being mounted on these upturned edges as indicated at 33.

When the catcher is in use the grass will, of course, accumulate on the throw-plate, but when the operator quickly operates the lever 11 with one foot the throw-plate is quickly and forcibly swung about its pivoted edge through the position 34 to throw the grass into the rear portion of the catcher. This operation requires but a moment, the weight of the throw-plate carrying it back to its normal position the moment the pressure on lever 11 is released. Since the bottom 1 does not extend under the throw-plate there is no opportunity for grass to gather there and interfere with the proper return of the plate to its normal position, the narrow strips 18 offering no support for the cut grass.

In using a grass catcher there is a tendency for the grass to be thrown more to one side than the other, to be unequally distributed over the bottom 1. In this embodiment of the invention not only is the throw-plate operated as described, but the whole bottom 1 is agitated at the same time, thereby more equally distributing the grass over the bottom and settling the same at the same time. This agitation is accomplished through the operation of lever 11 because at the same time that it actuates the throw-plate it operates to suddenly lift the whole bottom 1, the sliding connection at 22—24 permitting this action. Release of the lever 11, of course, permits the bottom 1 to return promptly to its normal position. Since the rear portion of rod 23 is supported from the handle bar 35 by rod 36, and the bottom 1 and throw-plate 5 are supported by the rod 23 through the medium of the canvas wall 2, and the pivot 28 is suported from the rod 23, it follows that the described movements of the bottom 1 and throw-plate 5 are quickly and easily effected.

Having thus described my invention, what I claim as new and desire to secure by Letters Patent is:

1. A device of the character described comprising, a lawn-mower grass-catcher having a throw-plate extending across the forward end of its bottom and hingedly connected to said bottom at its inner edge, a fulcrum mounted on the side of the catcher, a foot actuated lever mounted on the fulcrum, and means connecting the lever and throw-plate whereby actuation of the lever will move the throw-plate about its pivotal mounting to throw material gathered thereon rearwardly into the catcher.

2. A device of the character described comprising, a lawn-mower grass-catcher having a throw-plate extending across the forward end of its bottom and hingedly connected to said bottom at its inner edge and provided with a crank, a fulcrum mounted on the side of the catcher, a foot actuated lever mounted on the fulcrum, and a link connecting the short end of the lever and the crank whereby operation of the lever will actuate the throw-plate about its pivotal mounting to throw material gathered thereon rearwardly into the catcher.

3. A device of the character described comprising, a grass-catcher having a canvas wall and having a throw-plate extending across the forward portion of its bottom and hingedly connected to said bottom at its inner edge, fulcrum means mounted on the side of the catcher and supported from the top thereof, a lever mounted on said fulcrum with its short end extending forwardly thereof, means operatively connecting the last named end of the lever and the throw-plate whereby operation of the lever will actuate the throw-plate about its pivotal mounting and move the bottom relative to its canvas support.

4. A grass-catcher comprising, a top supporting frame, a wall of flexible material suspended therefrom, a bottom plate supported from said wall, a portion of said bottom plate comprising a throw-plate extending across the forward portion of the bottom and hingedly connected thereto at its inner edge, fulcrum means mounted on the side of the catcher and supported from the top thereof, a lever of the first class mounted on said fulcrum, throw-plate-actuating means connecting said plate and the short arm of said lever, and a vertically slidable connection between the bottom and the top supporting frame.

5. The structure set forth in claim 4 wherein the top supporting frame has loops formed in its forward ends, said ends thence passing downwardly and formed into terminal loops adapted to seat on the mower, and wherein the forward end of the bottom includes a transversely disposed rod having upstanding ends terminating in loops in sliding engagement with the first mentioned loops on the top frame.

6. A grass-catcher comprising, a body portion, a throw plate disposed across the forward end of its bottom and hingedly connected thereto at its inner edge, a fulcrum mounted on the catcher intermediate the top and bottom thereof and adjacent its rear end, a lever mounted on the fulcrum to extend rearwardly of the catcher and forwardly to a point adjacent the said hinged connection, and means connecting the last named end of the lever with the throw-plate whereby actuation of the lever will move the throw-plate about its pivotal mounting to throw material gathered thereon into the rear of the catcher.

JOHN CHARLES KIRCHER, Jr.